United States Patent [19]
Nimmo et al.

[11] Patent Number: 6,161,673
[45] Date of Patent: Dec. 19, 2000

[54] CONVEYOR ROLLER ASSEMBLY

[75] Inventors: Frank D. Nimmo; William R. Merz; W. Howard Newton, all of Cincinnati, Ohio

[73] Assignee: Rolcon, Inc., Cincinnati, Ohio

[21] Appl. No.: 09/557,525

[22] Filed: Apr. 24, 2000

Related U.S. Application Data

[63] Continuation-in-part of application No. 09/153,443, Sep. 15, 1998, Pat. No. 6,053,298.
[51] Int. Cl.$^7$ .................................................... B65G 13/00
[52] U.S. Cl. .................................................................. 193/37
[58] Field of Search ................................ 193/35 B, 35 R, 193/37

[56] References Cited

U.S. PATENT DOCUMENTS

| | | |
|---|---|---|
| 3,353,644 | 11/1967 | McNash et al. . |
| 3,402,802 | 9/1968 | Lint . |
| 3,610,387 | 10/1971 | Vom Stein . |
| 3,713,521 | 1/1973 | Moritake . |
| 5,421,442 | 6/1995 | Agnoff . |
| 5,645,155 | 7/1997 | Houghton .............................. 193/37 X |
| 5,678,676 | 10/1997 | Pierson ...................................... 193/37 |
| 5,865,290 | 2/1999 | Scott . |
| 5,875,878 | 3/1999 | Pierson . |

*Primary Examiner*—James R. Bidwell
*Attorney, Agent, or Firm*—Jacox, Meckstroth & Jenkins

[57] ABSTRACT

An elongated cylindrical roller tube is rotatably supported between frame members by a pair of bearing units secured to opposite end portions of the tube. Each bearing unit includes a tubular shaft supporting a hexagonal stub axle for axial movement between an outwardly projecting position engaging a frame member and an inwardly retracted position against the bias of a coil spring confined within the shaft. An anti-friction bearing is mounted on the tubular shaft and is retained within the roller tube by an annular adapter. An annular dust cover snap-fits onto the outer end portion of the tubular shaft for protecting the bearing, and the stub axle is retained within the shaft by detents which permit pulling the stub axle from the shaft for axle replacement. The axle, shaft, adapter and cover are each molded of an electrically conductive plastics material, and each hexagonal stub axle has a resilient outer, surface and a tapered and twisted outer tip portion extending from a slightly tapered portion for self-alignment of the axles with mating hexagonal holes within the frame members.

23 Claims, 3 Drawing Sheets

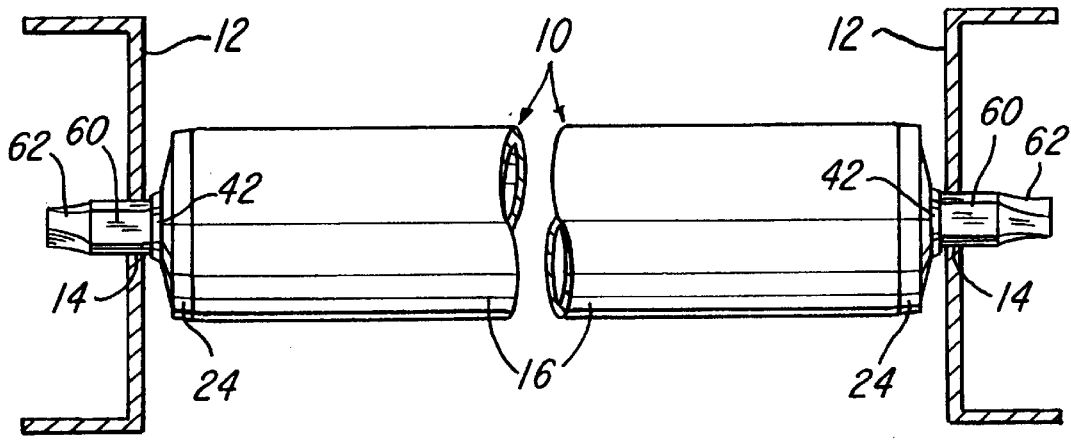
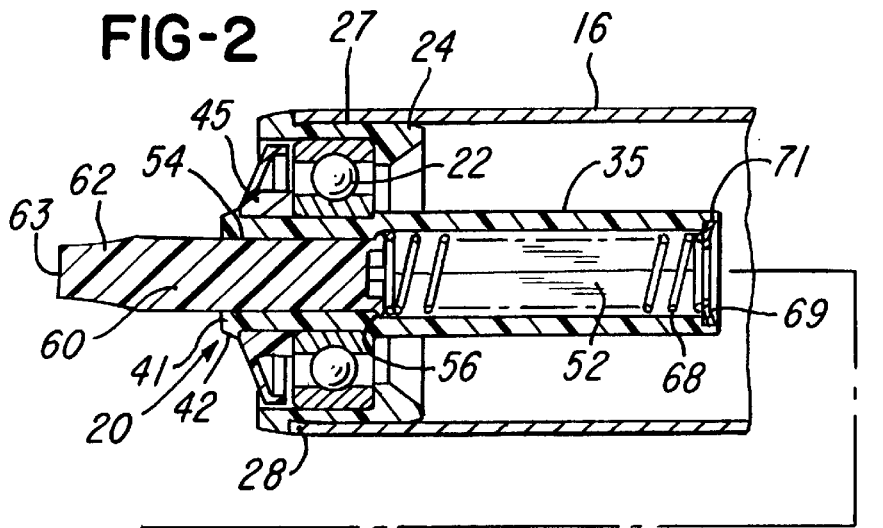
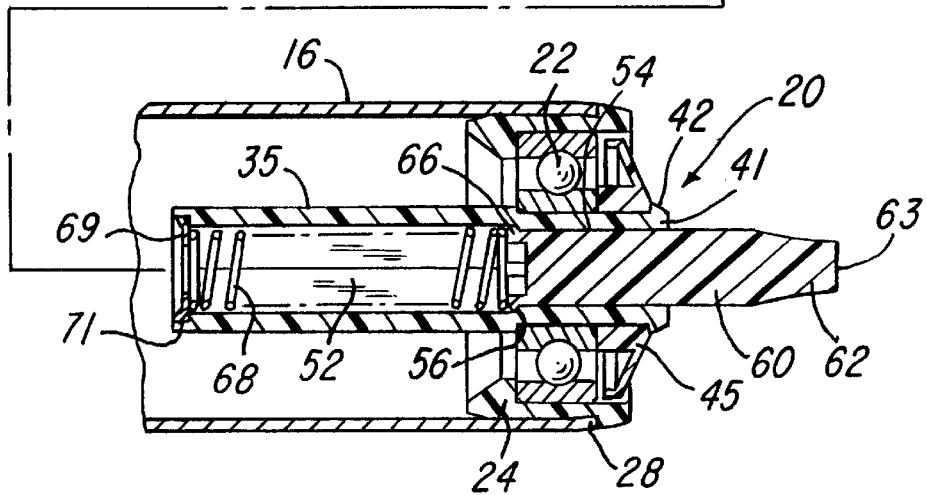

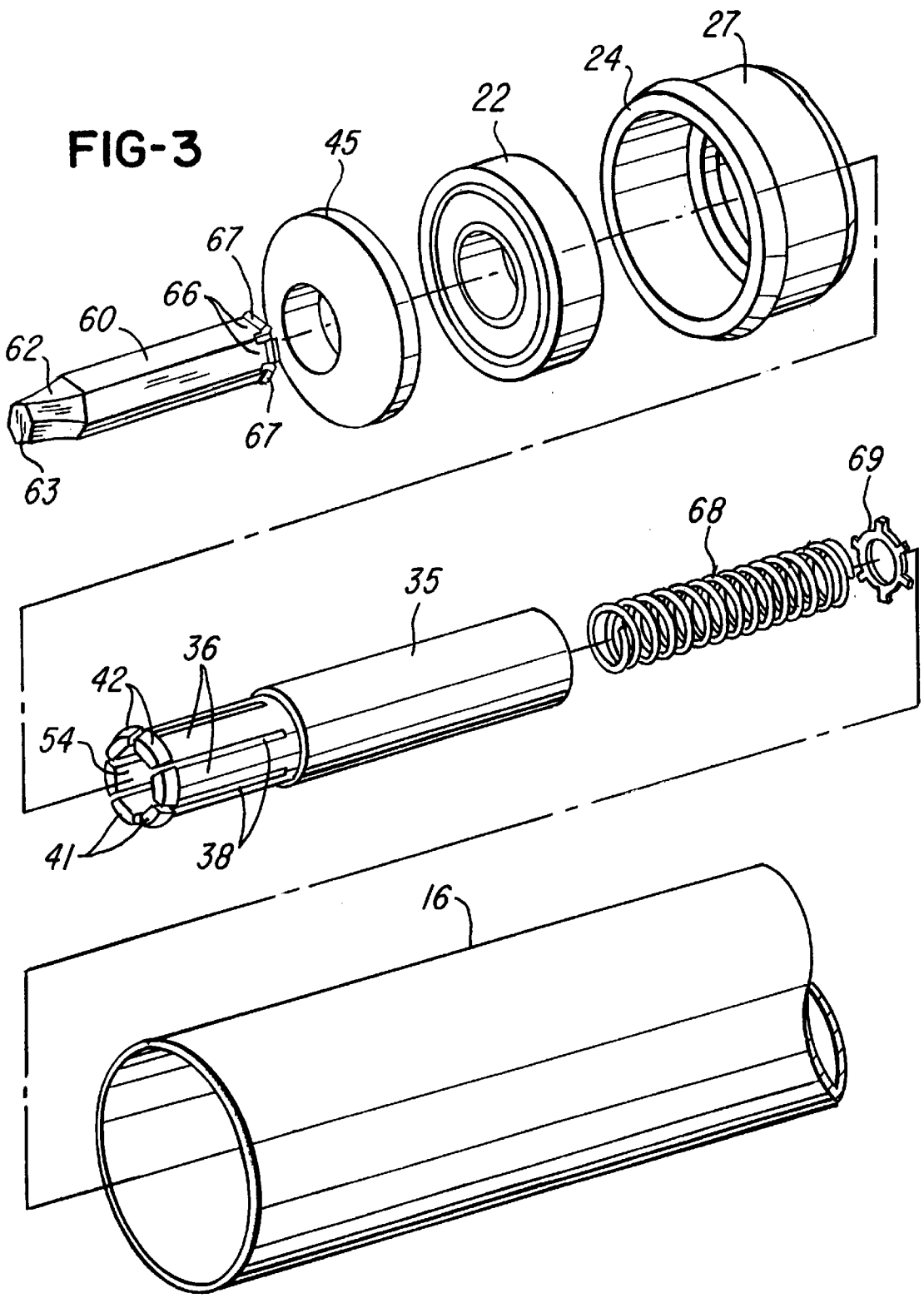

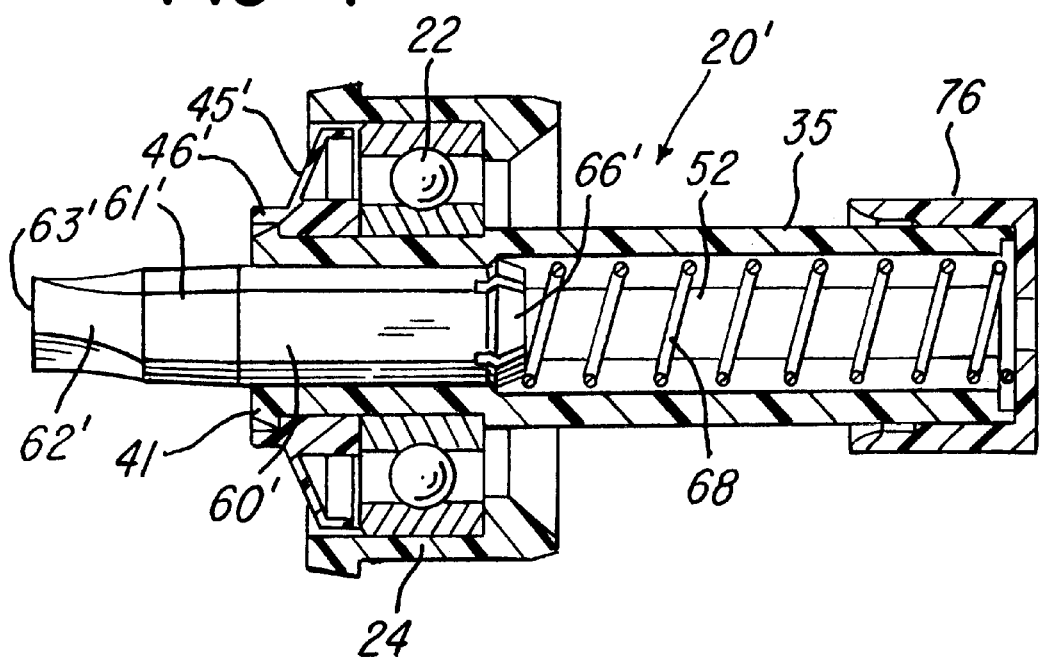

CONVEYOR ROLLER ASSEMBLY

RELATED APPLICATION

This application is a continuation-in-part of application Ser. No. 09/153,443, filed Sep. 15, 1998, U.S. Pat. No. 6,053,298.

BACKGROUND OF THE INVENTION

In the art of endless belt or roller conveyors, it is common to use a series of roller assemblies each of which includes an elongated metal roller tube supported on opposite ends by a pair of anti-friction ball bearings. The bearings are mounted by bushings on an elongated hexagonal axle which extends axially through the roller tube and has opposite end portions projecting from the tube. The axle is spring biased to a center position to permit axial movement of the axle relative to the roller tube for installing the roller assembly between horizontally spaced frame members or channels of a roller or belt conveyor having hexagonal holes within the channels to receive the end portions of the axle. One example of such a roller assembly is produced by Applicants' assignee and shown on its Product Bulletin #102. The axle or shaft extending through the roller tube may also be provided with a retractable stub axle or plunger for installing the conveyor roller between frame members, for example, as disclosed in U.S. Pat. No. 3,610,387. Other forms of roller assemblies having bearing shafts supporting retractable stub axles to facilitate installation and removal of the roller assemblies, are disclosed in U.S. Pat. No. 3,713,521 and U.S. Pat. No. 5,421,442.

With any such conveyor roller assembly, it is desirable to minimize the construction and maintenance costs of the assembly and to eliminate wear of the holes within the supporting frame members or channels. It is also desirable to provide for extending the service life of the roller assembly and for easily and quickly installing and replacing the roller assembly. In addition, it is desirable to minimize the noise level of operation of the roller assembly and to minimize the weight of the roller assembly for reducing shipping costs and simplifying roller replacement.

SUMMARY OF THE INVENTION

The present invention is directed to an improved conveyor roller assembly which is adapted for use between horizontally spaced frame members or channels of a conveyor and which provides all of the desirable features and advantages mentioned above. The roller assembly of the invention may be used for directly supporting articles to be conveyed or for supporting an endless conveyor belt which carries and transports the articles.

In accordance with a preferred embodiment of the invention, a conveyor roller assembly includes an elongated roller cylinder or tube which may be formed of metal or extruded of an electrically conductive rigid plastics material. Each end portion of the tube receives a bearing assembly or unit which includes a tubular shaft having an outer end portion which collapses slightly to receive the inner race of an anti-friction ball bearing having an outer race confined within the end portion of the roller tube by an annular adapter or bushing. The shaft has a hexagonal bore which receives an axially moveable hexagonal stub axle and encloses a compression spring which urges the stub axle to an outer projecting position. The outer collapsible end portion of the shaft also receives in snap-fit relation an annular dust cover which protects the shaft and retains the inner race of the bearing on the shaft.

The stub axle has an inner end portion with spring tabs having cam surfaces which engage a shoulder within the shaft but permit the stub axle to be pulled outwardly from the shaft for replacement of the axle while the coil spring is retained within the shaft by the shoulder. The hexagonal stub axle has a tapered and twisted outer tip portion which extends from a slightly tapered and resilient portion to provide self-alignment and a close fit of the hexagonal stub shaft with the hexagonal hole in the adjacent frame channel. The tubular shaft, stub axle, dust cover and adaptor bushing are all molded of a glass fiber reinforced plastics material which also contains carbon to provide electrical conductivity and dissipation of any static electrical charge.

Other features and advantages of the invention will be apparent from the following description, the accompanying drawings and the appended claims.

BRIEF DESCRIPTION OF THE DRAWINGS

FIG. 1 is an elevational view of a conveyor roller assembly constructed in accordance with the invention and shown installed between horizontally spaced frame members or channels;

FIG. 2 is a fragmentary axial section of the opposite end portions of the roller assembly shown in FIG. 1 and showing bearing assembly units constructed in accordance with the invention;

FIG. 3 is an exploded perspective view of one end portion of the roller assembly shown in FIGS. 1 & 2; and FIG. 4 is an axial section of a modified bearing assembly unit constructed in accordance with the invention.

DESCRIPTION OF THE PREFERRED EMBODIMENT

A conveyor roller assembly 10 constructed in accordance with the invention is adapted for use on a conveyor system which includes horizontally spaced elongated frame members or channels 12 having longitudinally spaced pairs of laterally aligned hexagonal holes 14 each having a dimension across the flats of 0.4375 inch. The roller assembly 10 includes a cylindrical roller tube 16 which is commonly cut from welded steel tubing, but may also be formed from an extruded tube of rigid plastics material. The extruded tube may have inwardly projecting and longitudinally extending reinforcing ribs or concentric walls connected by such ribs to provide maximum strength with minimum wall thickness and weight and also to provide for corrosion resistance.

Each of the opposite end portions of the conveyor roller tube 16 is rotatably supported by a corresponding bearing assembly unit 20 which preferably includes an anti-friction ball bearing 22 having an outer race confined within an annular adaptor bushing 24 molded of a rigid plastics material such as polypropylene and reinforced with glass fibers. The bushing 24 has an outer cylindrical surface 27 which slides into the end portion of the tube 16, and the bushing is retained within the tube by crimping the surrounding end portion 28 of the tube radially inwardly into a slight recess within the bushing around the periphery of the bushing 24. The rigid plastics material forming the bushing 24 also includes sufficient carbon particles so the bushing is electrically conductive to dissipate any electrostatic charge on the tube 16 into the bearing 22.

A tubular shaft member 35 has an outer end portion with spring fingers 36 formed between axially extending and circumferentially spaced slots 38, and each finger 36 has an arcuate outer tip portion 41 with a tapered cam surface 42.

The outer end portion of the tubular shaft 35 is slightly collapsible so that the end portion may be pressed into the inner cylindrical race of the bearing 22 during assembly of the bearing onto the shaft 35. The shaft member 35 is also injection molded of the same rigid plastics material as the bushing 24 and includes reinforcing glass fibers and carbon particles for conducting any electrostatic charge transferred through the bearing 22. An annular dust cover 45 is also mounted on the outer portion of the shaft 35 and has an inner bore with a diameter the same as the bore of the inner race of the bearing 22. Thus after the bearing 22 is mounted on the outer shaft portion, the dust cover 45 is mounted on the shaft portion by collapsing the spring fingers 36 in response to camming the tip portions 41 inwardly when the dust cover 45 is forced axially onto the cam surfaces 42.

The shaft member 35 defines an internal hexagonal chamber 52 and a slightly smaller hexagonal bore 54 within the collapsible outer portion of the shaft member. The bores 52 and 54 cooperate to define a tapered internal hexagonal shoulder 56. A hexagonal stub shaft or axle 60 is also molded of the same plastics material as the bushing 24, shaft member 35 and dust cover 45, and the material has glass reinforcing fibers and carbon for electrical conductivity. The stub axle 60 has a twisted and tapered outer tip portion 62 with a hexagonal outer end surface 63 oriented about 30° with respect to the larger hexagonal portion of the stub axle 60 which has a dimension across the flats slightly less than the dimension of the hole 14 in the frame channels 12. The hexagonal end surface 63 of the tip portion 62 has a dimension across the flats of about 0.375 inch.

The stub axle 60 has an inner end portion formed by six inwardly projecting tabs 66 (FIG. 3) each having an outwardly projecting V-shaped cam surface 67. The spring fingers or tabs 66 are cammed inwardly or collapsed slightly when the stub axle 60 is pressed axially into the hexagonal bore of the shaft member 35 to the position shown in FIG. 2. When the stub axle 60 is pulled axially outwardly from the hexagonal bore 54, the spring tabs 66 are cammed inwardly by the hexagonal tapered shoulder 56. Thus when the outer surface of a stub axle 60 is worn and it is desired to replace the stub axle, the roller assembly 10 is removed from the frame channels 12. The old stub axle may then be quickly pulled from the shaft member 35, after which a new stub axle 60 is inserted into the shaft member 35.

Each stub axle 60 is normally retained in its outwardly projecting or extended position, as shown in FIG. 2, by a compression coil spring 68 retained within the chamber 52 of the shaft member 35 by a spring retaining ring 69 pressed into a counterbore 71 within the inner end portion of the shaft member. The diameter of the spring 68 is sufficiently large so that the spring is confined within the chamber 52 against the shoulder 56 when the stub axle 60 is pulled axially from the shaft member 35 for replacement. The length of the chamber 52 is sufficiently long to permit the stub axle 60 to be depressed inwardly against the bias of the spring 68 until the end surface 63 of the tip portion 62 is flush with the outer end surface of the shaft member 35.

When it is desired to install a relatively short roller assembly 10 between the frame channels 12, the stub axles 60 projecting from opposite ends of the roller assembly are depressed axially inwardly against the springs 68 until the outer end surfaces 63 of the stub axles 60 are substantially flush with the outer end surfaces of the corresponding shaft members 35. The roller assembly 10 is then shifted downwardly until the tip portions 62 of the stub axles 60 enter the corresponding hexagonal holes 14. If either or both of the stub axles 60 is not rotationally aligned with the corresponding holes 14, the twisted and tapered tip portions 62 of the stub axles rotate the stub axles and shafts 35 until the stub axles are precisely aligned and are forced outwardly by the springs to their fully projecting positions (FIG. 2) within the mating openings 14. The stub axles 60, shaft members 35 and dust covers 45 are then prevented from rotating so that the bearings 22 support the tube 16 for free rotation. The tapered and twisted tip portion 62 of each stub axle 60 also permits one stub axle of a relatively long roller assembly 10 to be inserted into its corresponding hole 14 while the roller assembly is in a tilted position relative to the frame channels so that it is only necessary to depress one of the stub axles 60 inwardly to its retracted position in order to install a longer roller assembly 10 to its operating position as shown in FIG. 1.

Referring to FIG. 4 which shows a modified bearing assembly unit 20' constructed in accordance with the invention, the components which are the same as the components in the embodiment described above in connection with FIGS. 1–3 have the same reference numbers. The modified components have the same reference number with a prime mark, and additional components have additional reference numbers. Accordingly, the stub axle 60' is constructed similar to the stub axle 60, but is molded of a slightly resilient plastics material such as polyurethane and also includes a slightly tapered hexagonal portion 61' which is slightly resilient. For example, the slightly larger end of the tapered portion 61' and the base portion of the stub axle 60' may have a width across the flats which is 0.001" less than the width across the flats at the hexagonal hole 14 within the frame member or channel 12. For example, if the width across the flats of the hex hole 14 is 0.678", which is common, the large end of the slightly tapered portion 61' and the base portion of the stub axle 60' would have a width across the flats of 0.467".

The modification shown in FIG. 4 also includes an annular dust cover 45' with a projecting cylindrical ring portion 46' which surrounds the shaft segments or tips 41 of the tubular shaft 35. The projecting ring portion 46' protects the shaft end segments 41 and prevents them from being accidentally forced inwardly when the stub axle 60' is depressed inwardly, for example, if the bearing assembly unit 20' was dropped with the stub axle 60' hitting the floor. As also shown in FIG. 4, the compression spring 68 is retained within the chamber 62 by a cylindrical cap member 76 which is press fitted on the tubular shaft member 35. The cap 76 may also be retained by a suitable cement or adhesive which is compatible with the fiber reinforced plastics material.

From the drawings in the above description, it is apparent that a conveyor roller assembly constructed in accordance with the present invention, provides desirable features and advantages. For example, the roller assembly 10 provides for a reduced construction cost since all or most of the plastic components may be injection molded in a family mold, and the components of each bearing unit 20 or 20' may be quickly and easily assembled before the unit is inserted into the end portion of the tube 16. The resilient surface of the tapered portion 61' of the stub axle 61' not only eliminates wear of the corresponding hexagonal hole 14 within the frame channels 12 but also substantially eliminates wear of the stub axle by absorbing the vibrational energy. In addition, the tapered hexagonal portion 61' of the stub axle 60' minimizes the clearance with the hexagonal hole 14 to aid in eliminating wear.

While wear of the stub axles 60 or 60' is substantially eliminated, the stub axle 60 or 60' may be conveniently replaced simply by removing a roller assembly 10 and pulling the stub axle axially from the corresponding shaft member 35 and then replacing it with a new stub axle. As a result, down time of the conveyor is minimized. It has also been found that the resilient plastic stub axle 60 or 60' significantly reduced the noise level created by any movement of the stub axles within the holes in the frame channels 12. The construction of each bearing unit 20 or 20' also eliminates any side or axial loading on the bearing 22 which results in extending the service life of the bearing.

The plastic components of the bearing unit 20 or 20' also provide for high corrosion resistance and for dissipation of any static electricity on the roller tube 16. Also, if a bearing 22 does freeze or seize up, the bearing will turn on the plastic shaft member 35 so that there is no damage to the stub axle 60 or 60' or frame channel 12. The substantially lower weight of the bearing units 20 or 20' also significantly reduces the overall weight of the roller assembly 10. As a result, the shipping weight and shipment cost are lower, and roller replacement is less fatiguing, especially with the longer roller assemblies 10.

While the forms of conveyor roller assembly herein described constitute preferred embodiments of the invention, it is to be understood that the invention is not limited to this precise forms of assembly, and that changes may be made therein without departing from the scope and spirit of the invention as defined in the appended claims. For example, the stub axle 60 or 60' may have a metal or rigid core with a molded resilient outer layer or attached resilient sleeve to form the resilient outer surface for the stub axle. As another example, the spring 68 may have a tapered outer end portion which projects into the cavity surrounded by the tabs 66 of the stub axle 60 or 60'.

What is claimed is:

1. A conveyor roller assembly comprising an elongated roller tube having opposite end portions, a tubular shaft member disposed within each said end portion of said roller tube, a bearing confined within the corresponding said end portion of said roller tube to provide for rotation of said roller tube relative to said shaft member, a stub axle supported within each said shaft member for axial movement between an extended position with a portion of said stub axle projecting from an outer end of said shaft member and a retracted position within said shaft member, a spring within each shaft member and urging each said stub axle to said extended position, and each said shaft member and the corresponding said stub axle including a static electrical conductive non-metallic material.

2. A roller assembly as defined in claim 1 wherein each said stub axle is removable from said outer end of the corresponding said shaft member in response to pulling axially on said projecting portion of said stub axle.

3. A roller assembly as defined in claim 1 wherein each said tubular shaft member has a cylindrical outer end portion surrounding said stub axle and projecting through the corresponding said bearing, and each said outer end portion has circumferentially spaced slots providing for slightly collapsing said outer end portion for receiving said bearing.

4. A roller assembly as defined in claim 3 and including an annular dust cover mounted on said outer end portion of each said shaft member for protecting the corresponding said bearing, and each said dust cover includes a ring portion surrounding a tip portion of the corresponding said shaft member.

5. A roller assembly as defined in claim 1 wherein each said tubular shaft member has a hexagonal inner opening slidably receiving the corresponding said stub axle and defines an internal shoulder, and each said stub axle has a slightly collapsible inner end portion engaging said shoulder in response to said spring when said axle is in said extended position.

6. A roller assembly as defined in claim 5 wherein said inner end portion of each said stub axle moves inwardly in response to pulling said stub axle outwardly from the corresponding said shaft member.

7. A roller assembly as defined in claim 5 wherein said spring comprises a coil spring adapted to engage said shoulder when said stub axle is pulled from said shaft member for retaining said spring within said shaft member when said stub axle is removed.

8. A roller assembly as defined in claim 1 wherein each said stub axle has a hexagonal cross-sectional configuration and a tapered and twisted outer tip portion with a smaller hexagonal cross-sectional configuration.

9. A roller assembly as defined in claim 8 wherein each said stub axle has a slightly tapered hexagonal portion extending from said tip portion.

10. A roller assembly as defined in claim 1 wherein said projecting portion of each said stub axle has a resilient outer surface.

11. A conveyor roller assembly comprising an elongated roller tube having opposite end portions, a tubular shaft member disposed within each said end portion of said roller tube, a bearing supported by each said shaft member and confined within the corresponding said end portion of said roller tube to provide for rotation of said roller tube relative to said shaft member, a stub axle supported within each said shaft member for axial movement between an extended position with a portion of said stub axle projecting from an outer end of said shaft member and a retracted position within said shaft member, a spring within each said shaft member and urging the corresponding said stub axle to said extended position, and each said stub axle being removable from said outer end of the corresponding said shaft member in response to pulling axially on said projecting portion of said stub axle.

12. A roller assembly as defined in claim 10 wherein each said tubular shaft member has a cylindrical outer end portion surrounding the corresponding said stub axle and projecting through the corresponding said bearing, and each said outer end portion has circumferentially spaced slots defining spring fingers which collapse slightly for receiving said bearing.

13. A roller assembly as defined in claim 12 and including an annular dust cover mounted on said spring fingers of each said shaft member for protecting the corresponding said bearing, and each said dust cover includes a ring portion surrounding an outer tip portion of the corresponding said shaft member.

14. A roller assembly as defined in claim 11 wherein each said tubular shaft member has a hexagonal inner chamber slidably receiving the corresponding said stub axle and defining an internal shoulder, and each said stub axle member has a slightly collapsible inner end portion opposing said shoulder when said stub axle is in said extended position.

15. A roller assembly as defined in claim 14 wherein said inner end portion of each said stub axle has spring tabs which move inwardly in response to pulling said stub axle outwardly from the corresponding said shaft member.

16. A roller assembly as defined in claim 14 wherein each said spring comprises a compression coil spring confined within of the corresponding said tubular shaft member, and said coil spring engages said shoulder when said stub axle member is pulled from said shaft member for retaining said spring within said shaft member when said stub axle is removed.

17. A roller assembly as defined in claim 11 wherein each of said stub axles has a hexagonal cross-sectional configuration and a tapered and twisted outer tip portion with a smaller hexagonal cross-sectional configuration.

18. A roller assembly as defined in claim 13 wherein each said stub axle has a slightly tapered hexagonal portion extending from said tip portion.

19. A roller assembly as defined in claim 11 wherein said projecting portion of each said stub axle has a resilient outer surface.

20. A conveyor roller assembly comprising an elongated roller tube having opposite end portions, a bearing supported within each said end portion of said roller tube to provide for rotation of said roller tube, a tubular shaft member supported within each of said bearings, a hexagonal stub axle supported within each said shaft member for axial movement and having an outer portion projecting from the corresponding said shaft member, and said outer portion of at least one if said stub axles having a tapered and twisted outer tip portion with a smaller hexagonal cross-sectional configuration.

21. A roller assembly as defined in claim 20 wherein each said stub axle has a slightly tapered hexagonal portion extending from said tip portion.

22. A roller assembly as defined in claim 20 wherein said projecting portion of each said stub axle has a resilient outer surface.

23. A conveyor roller assembly comprising an elongated roller tube having opposite end portions, a bearing supported within each said end portion of said roller tube to provide for rotation of said roller tube, a tubular shaft member supported within each of said bearings, a stub axle supported within each said shaft member for axial movement and having an outer portion projecting from the corresponding said shaft member, and said outer portion of each said stub axles having a resilient outer surface.

* * * * *